United States Patent [19]

Dudgeon

[11] 4,355,123

[45] Oct. 19, 1982

[54] CURED POLYESTER COMPOSITIONS AND PROCESS FOR THEIR PRODUCTION

[75] Inventor: Charles D. Dudgeon, Clifton Park, N.Y.

[73] Assignee: General Electric Company, Schenectady, N.Y.

[21] Appl. No.: 216,902

[22] Filed: Dec. 16, 1980

[51] Int. Cl.³ .............................................. C08K 5/05
[52] U.S. Cl. .................................... 523/511; 525/11; 525/445; 525/921; 528/303; 528/306
[58] Field of Search ................. 525/11, 445, 168, 173, 525/174, 921; 528/303, 306; 260/40 R; 523/511

[56] References Cited

U.S. PATENT DOCUMENTS

| | | | |
|---|---|---|---|
| 3,432,458 | 3/1969 | Kwan et al. | 523/511 |
| 3,631,144 | 12/1971 | Deis et al. | 525/11 |
| 3,740,353 | 6/1973 | Patrick et al. | 525/168 |
| 3,989,655 | 11/1976 | Rudolph et al. | 525/168 |
| 4,290,939 | 9/1981 | Bertsch et al. | 260/40 R |

FOREIGN PATENT DOCUMENTS 2037298 7/1980 United Kingdom ............... 525/168

OTHER PUBLICATIONS

Insulation/Circuits, Jan. 1979, "High Performance Cycloaliphatic Epoxide Systems for Electrical Apparatus"; A. S. Burhans, pp. 37–40.

Primary Examiner—Ronald W. Griffin
Attorney, Agent, or Firm—Hedman, Casella, Gibson & Costigan

[57] ABSTRACT

Cured polyester compositions and their production are described. These are produced by curing a composition containing polyester resin and aliphatic polyol having a molecular weight of at least about 2000. The polyol acts to reduce normal polyester shrinkage incident to curing so as to produce improved articles.

11 Claims, No Drawings

CURED POLYESTER COMPOSITIONS AND PROCESS FOR THEIR PRODUCTION

BACKGROUND OF THE INVENTION

Polyesters have long been proven to be particularly useful polymers.

Curable compositions are employed in the production of potted or encapsulated electronic or electrical components. Both epoxy and unsaturated polyester resin compositions are used for this purpose. Epoxy resins are much more expensive, but are favored. One of the reasons that epoxy resins are favored over unsaturated polyesters is the fact that unsaturated polyesters will exhibit about 5–10% degree of volume shrinkage during cure. When potting electrical or electronic components this shrinkage is undesirable because it will result in separation from the walls of the container (which becomes an integral part of the finished component) or in cracks in the cured resin.

Curable resins are also used in a potting technique known as "pot-on-sand". In this technique, sand is poured into the container to cover the electrical or electronic component and a low viscosity resin is then poured over the sand. This resin must completely penetrate the sand before it cures to give a completely solid void free potted part.

In the past a number of thermoplastics such as polyvinyl acetate, polycaprolactone, polystyrene, polyethylene, styrene-butadiene copolymers and liquid rubbers such as butadiene-acrylonitrile and hydroxy terminated polyepichlorohydrin have been used to reduce the shrinkage of unsaturated polyester resins. All of these examples suffer from one of two problems. Either they are not compatible with unfilled unsaturated polyester resin solutions (and therefore can be used only in highly filled compositions) or else when added to the unsaturated polyester resin they result in greatly increased viscosity.

It has now been discovered that improved unfilled, solution stable, unsaturated polyester resin compositions can be provided by adding thereto a member of a family of specified aliphatic polyols. Such compositions exhibit low shrinkage on cure but still are low enough in viscosity to penetrate fine sand. These compositions are thus uniquely suitable for use in electrical or electronic pot-on-sand applications. As will be seen hereinafter, when poured onto two inches of sand, the resin of this invention completely penetrates the sand before gelation occurs.

The teachings of A. S. Burhans, *Insulation/Circuits;* January 1979, pages 37, are acknowledged. However, this relates to the use of polypropylene polyols in reactive admixture with cycloaliphatic epoxies to flexibilize them and improve their thermal shock resistance. This in no way makes it obvious to use polypropylene glycols with unsaturated polyesters to reduce shrinkage in the latter.

INTRODUCTION TO THE INVENTION

In its broadest aspects, this invention relates to curing an improved polyester material and to the cured materials. The invention is highlighted by an improved means for reducing the shrinkage of the polyester material incident to curing.

It has been discovered that incorporation of an amount of aliphatic polyol having a molecular weight of at least 2000 into the uncured polyester resin material can greatly reduce subsequent polyester shrinkage. Such polyols neither adversely affect the viscosity nor the stability of the polyester materials. Consequently, they also facilitate production and improve the quality of product articles containing the cured polyester.

DESCRIPTION OF THE INVENTION

The steps of the present process are entirely conventional. The curable polyester resin is formulated with the polyol and is then cured into a solid product article.

Any curable unsaturated polyester resin composition may be utilized in accordance with the present process. Representative are: the reaction products of an acid component containing, e.g., maleic acid, maleic anhydride, and/or fumaric acid, and the like, and, optionally, saturated acids or derivatives such as phthalic anhydride and adipic acids with a glycol component, e.g., ethylene glycol, propylene glycol, and the like. Conventionally, these also include 30 to 60% by weight of an unsaturated monomer copolymerizable with the unsaturated polyester, e.g., styrene, vinyltoluene, and the like. The polyester resins normally comprise at least 30%, preferably from 40 to 80% by weight of the total resin material.

The polyester compositions may additionally contain any of the conventional additives and other accessory components well known for such resins. These include other polymers, curing catalysts, accelerators, fillers and the like. Preferably, only such components as are soluble in the polyester resin material are employed. This ensures the physical stability and homogeneity of the material.

The aliphatic polyol utilized to reduce the cure-induced shrinkage of the polyester resin composition is desirably a substituted saturated hydrocarbon having a molecular weight of at least 2000. More preferably, it has a molecular weight of from about 4000 to 9000. These polymers are also preferably essentially linear, as opposed to branched.

These polyols are soluble in the polyester resins of the present invention. This ensures the physical stability of the resin material. These polyols may, in contrast, be insoluble in the cured resin composition. This causes them to separate from the material incident to curing and to produce a second and separate morphological phase in the corresponding composition of the product articles. This physical separation is believed partially responsible for their ability to reduce polyester shrinkage.

Although any such aliphatic polyol may be employed, suitable ones are most conveniently obtained by conventional polymerization or copolymerization. Vinyl alcohols and alkenes may, for example, simply be condensed to produce them. The polyols should contain at least two alcohol groups and preferably contain from about 2 to 6 such groups. Representative and preferred are polypropylene triols within the foregoing molecular weight range. A suitable material commercially available is Union Carbide's LHT-34.

Although the amount of aliphatic polyol utilized may vary widely, from about 5 to 40% by polyester weight is normal. From 10 to 30% is preferred. Within this range, shrinkage is usually essentially eliminated.

These amounts of polyol also facilitate handling and use of the polyester resin composition during the process of the present invention. They permit material viscosities of unexpectedly low levels. This greatly facilitates, for example, their use in the pot-on-sand technique mentioned above and in similar applications.

The present invention is more fully described by the following examples. These examples are not limitative, but rather illustrative, of the invention.

EXAMPLE 1

Two 250 ml beakers (A and B) are filled with a polyester resin material having the following composition:

| | |
|---|---|
| 74.0 g | Polyester resin (GE 704) |
| 25.5 g | Vinyl toluene |
| 0.2 g | Dimethyl aniline (accelerator) |
| 2.0 g | Lupersol DDM (catalyst) |

To beaker A only is then added 20 g of a polypropylene triol having a molecular weight of about 5000 (Union Carbide LHT-34). The resulting solutions are poured into two separate 10 cm diameter tins. Each solution of polyester material gels within 30 minutes.

The material of beaker A (containing polyol) turns milky white in color incident to curing. This suggests formation of separate morphological phases. It does not, however, appear to undergo any change in volume or configuration. In contrast, the control sample of beaker B develops cracks and shrinks away from the walls of the tin, while remaining clear.

The two samples are allowed to cure further overnight at room temperature and were then postbaked for one hour at 250° C. No physical changes are observed. In particular, the sample of beaker A (this invention) shows no apparent shrinkage.

When poured over two inches of sand, the resin composition according to this example completely penetrates the sand before it gels.

EXAMPLE 2

A 250 ml beaker is filled with a polyester resin material having the following composition:

| | |
|---|---|
| 74.0 g | Polyester resin (GE 704) |
| 25.5 g | Vinyl toluene |
| 0.2 g | Dimethyl aniline (accelerator) |
| 10.0 g | Polypropylene triol (MWt 5000) |
| 2.0 g | Lupersol DDM (catalyst) |

This solution is poured into a 10 cm diameter tin and cured for 30 minutes at 60° C. During cure, the clear solution develops a hazy appearance. Even after a further postbake for 1 hour at 250° C., the cured composition evidences no apparent shrinkage.

While the present invention has been described with reference to particular embodiments, it is understood that numerous modifications may be made by those skilled in the art without departing from its spirit and scope. Therefore, the appended claims are intended to cover all such equivalent modifications as come within the true scope of this invention.

I claim:

1. In a process for the production of a cured polyester resin composition comprising formulating a curable such composition and then curing said curable composition, the improvement wherein said composition contains an amount of aliphatic polyol having a molecular weight of at least about 2000 sufficient to reduce polyester resin shrinkage incident to curing.

2. The process of claim 1, wherein the aliphatic polyol has a molecular weight of between about 4000 and 9000.

3. The process of claim 1, wherein the polyol is polypropylene triol.

4. The process of claim 1, wherein the polyol is dissolved in the uncured polyester resin of the composition.

5. The process of claim 1, wherein the composition contains from 40 to 80% polyester resin by total weight.

6. The process of claim 1, wherein the composition contains 5 to 40% polyol by weight of polyester resin.

7. The process of claim 1, wherein the composition is cured in a mold to provide a three-dimensional article.

8. A cured polymer composition comprising cured polyester resin and from 5 to 40% by resin weight of aliphatic polyol having a molecular weight of from about 4000 to 9000.

9. The composition of claim 8, wherein the cured polyester resin and polyol constitute separate morphological phases of a molded composition.

10. The composition of claim 9, wherein the composition contains from 40 to 80% polyester resin by total weight.

11. The article of claim 10, wherein the polyol is polypropylene triol.

* * * * *